United States Patent [19]

Kono et al.

[11] 4,452,154
[45] Jun. 5, 1984

[54] PROCESS AND APPARATUS FOR DRY DISTILLATION OF DISCARDED RUBBER TIRES

[75] Inventors: Hiroshi Kono; Haruhiko Asao, both of Iwaki, Japan

[73] Assignee: Onahama Seiren Kabushiki Kaisha, Tokyo, Japan

[21] Appl. No.: 347,267

[22] Filed: Feb. 9, 1982

[30] Foreign Application Priority Data

| Aug. 4, 1981 [JP] | Japan | 56-121429 |
| Sep. 14, 1981 [JP] | Japan | 56-143806 |
| Sep. 14, 1981 [JP] | Japan | 56-143807 |

[51] Int. Cl.³ .................................................. F23G 5/00
[52] U.S. Cl. ...................................... 110/346; 110/256
[58] Field of Search ................ 110/256, 235, 248, 346

[56] References Cited

U.S. PATENT DOCUMENTS

| 2,895,434 | 7/1959 | Werner | 110/256 |
| 3,801,082 | 4/1974 | Anderson | 110/256 |
| 3,985,518 | 10/1976 | Anderson | 110/256 |
| 4,210,087 | 7/1980 | Melan et al. | 110/256 |
| 4,213,403 | 7/1980 | Gomori | 110/216 |

FOREIGN PATENT DOCUMENTS 53-25874 7/1978 Japan.
53-27752 8/1978 Japan.

*Primary Examiner*—Henry C. Yuen
*Attorney, Agent, or Firm*—Wenderoth, Lind & Ponack

[57] ABSTRACT

Discarded rubber tires are charged in random state into a vertical dry distillation furnace, and the tires at a lower part thereof are caused to undergo combustion to give off hot combustion gases by which the tires at higher levels undergo dry distillation to produce distillation gases which are useable as fuel. The combustion is started by burners and is then self-sustained by supplying only air. The furnace interior at its part below the combustion zone is expanded or flared in the downward direction to an open end immersed in water, but the downward movement of the tires and residue is braked by a self-sustained grate effect until the residue finally drops out of the furnace to be removed by a conveyor. The continuous and efficient operation over a long period of this furnace is assisted by a separator also capable of long continuous operation.

3 Claims, 13 Drawing Figures

FIG. 3
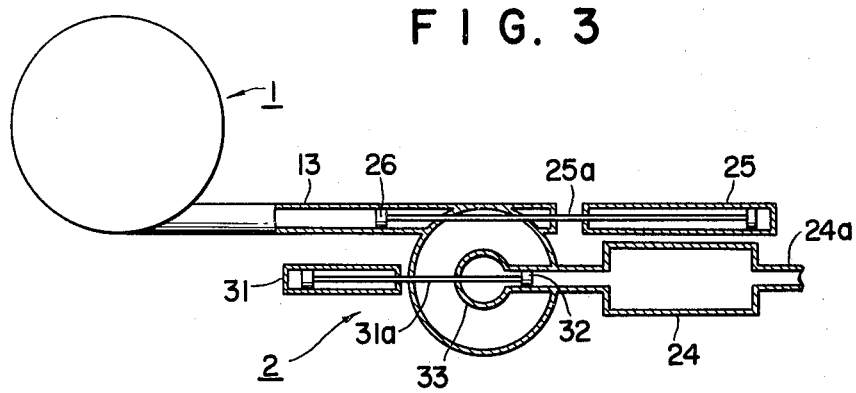
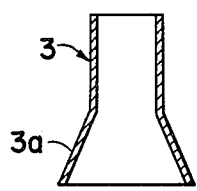
FIG. 4a
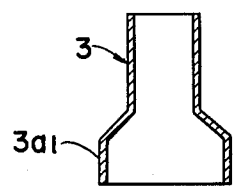
FIG. 4b
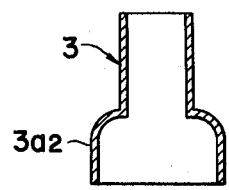
FIG. 4c
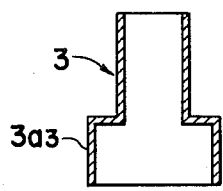
FIG. 4d
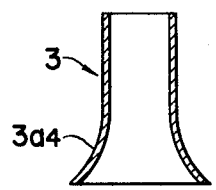
FIG. 4e
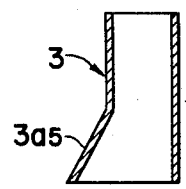
FIG. 4f
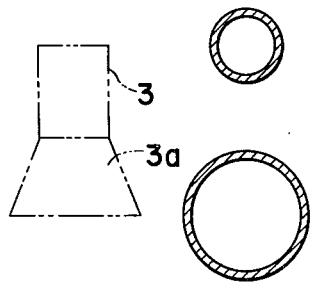
FIG. 5a
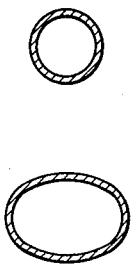
FIG. 5b
FIG. 5c
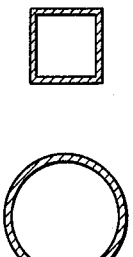
FIG. 5d

PROCESS AND APPARATUS FOR DRY DISTILLATION OF DISCARDED RUBBER TIRES

BACKGROUND OF THE INVENTION

This invention relates to the dry distillation of overworn discarded rubber tires of vehicles and more particularly to a process and apparatus for continuously and smoothly dry distilling discarded tires thereby to recover gases and liquids for combustion.

As a consequence of the rapid development of motorization in recent years, there has been a tremendous increase in the rate at which overworn or worn-out rubber tires (hereinafter referred to simply as tires) of land vehicles are being discarded. Of these tires, one portion is being reutilized as retreaded tires, but most of the tires are being disposed of as refuse. Because of the shape and bulk of tires, however, they cannot be disposed of as they are as filling material for land reclamation and other purposes, and, in some instances as a stopgap lawful method of land reclamation, tires are being cut up into pieces of suitable size and then used as filling material.

Another method of disposal of such tires is the combustion thereof. On a small scale, tires are being burned outdoors in agricultural fields and orchards for the purpose of preventing frost damage. In this case, however, the gases of combustion of rubber have a characteristic bad odor, whereby tires cannot be burned in the open except in such emergency cases. The quantity of tires used in such instances is a mere 2 to 3 percent of the total quantity of tires discarded.

On the other hand a sudden interest in the utilization of tires as a combustible material is becoming apparent as a result of the rise in energy costs. This is a natural result because of the high calorific value of tires of approximately 8,000 Kcal/kg, and already most of the tires, exclusive of those being retreaded, are beginning to be used as a substitute fuel.

However, because of structural features of tires such as their characteristic shape and steel wire incorporated therein, direct combustion of these tires requires pretreatment such as cutting and an after treatment, such as the removal of steel wires from the tires after combustion. Furthermore, because of the characteristicly high surface density of rubber, the degree of contact of the rubber with air for combustion is small, whereby incomplete combustion tends to occur, and black smoke and unpleasant odors are easily given off. Combustion of tires in large quantities is difficult in actual practice without the use of large furnaces affording long combustion zones.

As another approach, it is also possible, since combustible gases and liquid fuels can be generated by dry distilling rubber at relatively low temperatures, to once extract gas and liquid fuels and to burn them in a separate combustion furnace. In this case, the steel wire and other solids are left as residue and separated, and even if the distillation furnace and the combustion furnace are installed in a spaced apart relation, continuous operation is possible by merely connecting them with transfer piping for gaseous and liquid fuels, whereby effective utilization is readily attainable.

Accordingly, numerous techniques relating to the dry distillation of tires have heretofore been disclosed and proposed. For example, Japanese Patent Publication Nos. 25874/1978 and 27752/1978 disclose apparatuses in each of which vertical preheating and dry distillation furnaces are coupled in a gas-tight manner, and, for horizontally stacking tires therein to carry out preheating and dry distillation, respectively, and means for horizontally, handling each tire for charging the tires and removing the residue must be installed. In the operation of each apparatus, preheating and dry distillation proceed as the tires being processed in the furnaces descend one at a time, being continually maintained in horizontal state, and finally the non-volatile residue is taken out.

In a furnace of this known character, support of the tires in an orderly disposition is maintained within the furnace by a tire supporting mechanism comprising a forkshaped tire receptacle provided near the bottom of the furnace and functioning as a movable grate. In the dry distillation furnace described in Japanese Patent Publication No. 27752/1978, a butterfly-shaped grate is separately provided below the support fork to function cooperatively in supporting the tire charged into the furnace and in taking out the dry distillation residue. However, after a long period of operation of these apparatuses, problems tend to arise in the taking out of the residue.

Still another proposed furnace is of a construction wherein the inner diameter of the vertical furnace is made greater than the outer diameter of the tires at the upper part of the furnace and is tapered to become smaller than the tire outer diameter at the lower part of the furnace, and this constricted lower part is caused to exhibit a grate effect to support the tires charged into the furnace. Since there are no support structures such as a grate in the interior space of this furnace, there is little possibility of substances such as residue and semi-molten material formed in the high-temperature part of the furnace being caught or adhering to parts of the furnace, and it would seem that the operation can be expected to proceed under considerably favorable conditions.

However, this furnace has a drawback in that it is difficult to take out scrap wire after completion of dry distillation and incompletely distilled residual tires frequently produced in actual operation because of the constriction at the lower part of the furnace. Particularly in the case of continuous operation, which almost always means operation over a long period, there is a continuous accumulation of residue at the bottom of the furnace, whereby removal of this residue tends to become difficult.

In the case of batch-wise operation, it is possible, upon the completion of dry distillation of each batch, to take out the residue, including scrap wire, and carbon particles adhering to various interior parts of the apparatus as described hereinafter. This work, however, is extremely troublesome and requires much time and labor. Furthermore, a batch-wise operation unavoidably entails periodic interruptions thereof, whereby a stable operation under steady conditions cannot be achieved.

In view of the above described circumstances in the state of the prior art, we have carried out a detailed analysis of the phenomena occurring within a dry distillation furnace of the instant character during operation in order to facilitate the taking out of the dry distillation residue. As a result, from a completely separate line of thinking, we have arrived at the conceptual conclusion that the cross-sectional area of the furnace at its lower part should be made the same as or greater than that of its upper part. Furthermore, we have carried out tests based on this concept, as a result of which we have succeeded in developing this invention.

More specifically, we have carried out studies on the premises:

(1) that, within a furnace reaching a high temperature, mechanisms which can become obstructions to the falling or downward movement of charged material must be eliminated as much as possible;

(2) that, since continuous operation is the general rule, mechanisms such as that for holding charged material and that for taking out residue, which are used only at the starting and stopping of operation must be dispensed with and substituted by a mechanism for continuous operation which is most easy to control and, moreover, is efficient for ordinary continuous operation; and (3) that, for facilitating of tire charging and for uniformity of heat distribution within the furnace, the tires charged into the furnace must be stacked in random directions.

As a result, we have found that, during steady operation, the charged tires, the residue of these tires, and the like, while combining naturally to form suitable gas passages within the furnace, brake and retard the charged material in the upper part of the furnace, whereby not only is a grate unnecessary, but since the combined mechanism progressively varies, it is useful in the stabilization of the furnace condition. Moreover, since the dry distillation residue is predominantly steel wire, it is extremely bulky, and if there are some obstructions within the furnace, this steel wire is readily caught thereby, whereby the taking out of the residue is hindered.

Therefore, it was verified that expanding the furnace cross-sectional area in the downward direction is desirable for facilitating the work of taking out the residue, that at least there is absolutely no necessity of constricting the lower part of the furnace relative to its upper part, and that, if the lower diameter is smaller than the upper diameter, trouble occurs frequently during the work of taking out the residue.

It was confirmed further that when the inner diameter of the furnace is made constant or is downwardly expanded, bridging blockage or a so-called log-jamming effect of the charged tires as they naturally fall or move downward is prevented, and that, in addition, the charged tires are automatically restacked as they sink while they are dry distilled and burned, whereby uniform reaction is facilitated, and the solid materials exhibit an effect of forming their own grate. These effects cannot be obtained in systems wherein tires are charged horizontally one at a time.

On the basis of the above described findings and conclusion, we have developed a process and furnace for continuously dry distilling tires over long periods of time. However, still another problem must be solved before this continuous and long-period dry distillation of tires can be profitably practiced. That is, one hindrance to the continuous and long-period distillation of tires has heretofore been the presence of a great quantity of dust particles, comprising principally carbon particles, in the gases generated in and discharged from the tire dry distillation process step.

More specifically, oils produced in the dry distillation adhere to these dust particles (hereinafter referred to as carbon) to form sticky carbon, which adheres to the inner wall surfaces of the apparatus and parts such as complicated bent parts and gas passages and, upon accumulating, gives rise to various difficulties such as clogging of passages. Accordingly, we have developed an apparatus for dry distilling tires which can be operated continuously and over long periods under stable conditions within the dry distillation furnace, and in which removal of adhering carbon can be accomplished without stopping the operation of the apparatus.

SUMMARY OF THE INVENTION

According to this invention in one aspect thereof, there is provided a process for the dry distillation of discarded tires which comprises charging the tires into the upper part of a vertical furnace to cause the tires to descend progressively, causing the lower tires to undergo oxidation combustion, dry distilling the upper tires with the resulting combustion gases, and collecting gaseous fuel and/or liquid fuel thereby distilled. The invention is characterized in that the tires are charged and stacked in a random state and thus caused to descend through the furnace whose horizontal cross-sectional area of its interior at its lower part is at least equal to those at higher parts of the furnace, the descent of the tires and resulting tire residue being braked by a self-formed and self-sustained grate effect until the final solid residue descends further to be discharged out of the furnace.

According to this invention in another aspect thereof, there is provided an apparatus for dry distillation of discarded tires comprising: a vertical furnace structure having an inlet opening at its top and an open lower end part; a feeding device for feeding discarded tires into the inlet opening; a leakage-sealing damper disposed in the upper part of the furnace in the vicinity of the inlet opening for preventing escape of gases to the outside through the upper part; first damper means disposed below and apart from the leakage-sealing damper for reserving the tires thus fed and subsequently dropping the same into the lower interior of the furnace structure constituting a reaction chamber, whose horizontal cross-sectional area at said lower end part is at least equal to those at higher parts of the furnace, the upper and lower parts of the reaction chamber becoming a dry distillation zone and a combustion zone, respectively, during operation, an upper chamber being thus formed between the leakage-sealing damper and the first damper means, the first damper means, when in closed state, sealing the upper chamber from the furnace interior below the first damper means; a gas discharge outlet provided at the upper part of the reaction chamber for discharging distilled gases; a tuyere disposed around the combustion zone for supplying air thereinto; burners for combustion mounted in the furnace wall in the vicinity of the tuyere for initiating combustion of the tires in the combustion zone; a water sealing device for sealing the interior of the open lower end part of the furnace structure from the outside air yet permitting residue of distillation and combustion to drop out of the furnace structure; and a residue discharging device for discharging the residue thus dropped.

According to this invention in still another aspect thereof, there is provided an apparatus as described above which further comprises a separator for separating carbon particles from the distillation gases obtained from the dry distillation in the dry distillation furnace, the separator being connected, preferably by a straight pipe, to the gas discharge outlet of the reaction chamber of the furnace and comprising: a separating device having an inlet to which the downstream end of said straight pipe is connected and operating to separate carbon particles from the distillation gases, which are then discharged through an outlet; a hopper connected to the bottom of the separating device for collecting the carbon particles thus separated; and carbon removers actuated by actuating rods of respective actuating means to remove carbon particles from the interiors of the gas discharge pipe and the separating device, respectively.

The nature, utility, and further features of this invention will be more clearly apparent from the following detailed description with respect to a preferred embodiment thereof when read in conjunction with the accompanying drawings, briefly described below.

BRIEF DESCRIPTION OF THE DRAWINGS

In the drawings:

FIG. 3 is a plan view, with parts shown in horizontal section, of the separator illustrated in FIG. 2;

FIGS. 4a through 4f are elevational views, in vertical section, respectively showing different flared shapes of the lower end part of the distillation furnace structure; and FIGS. 5a through 5d are plan views respectively showing different horizontal cross sections of the furnace lower end part at two levels.

DETAILED DESCRIPTION OF THE INVENTION

Figure 1:
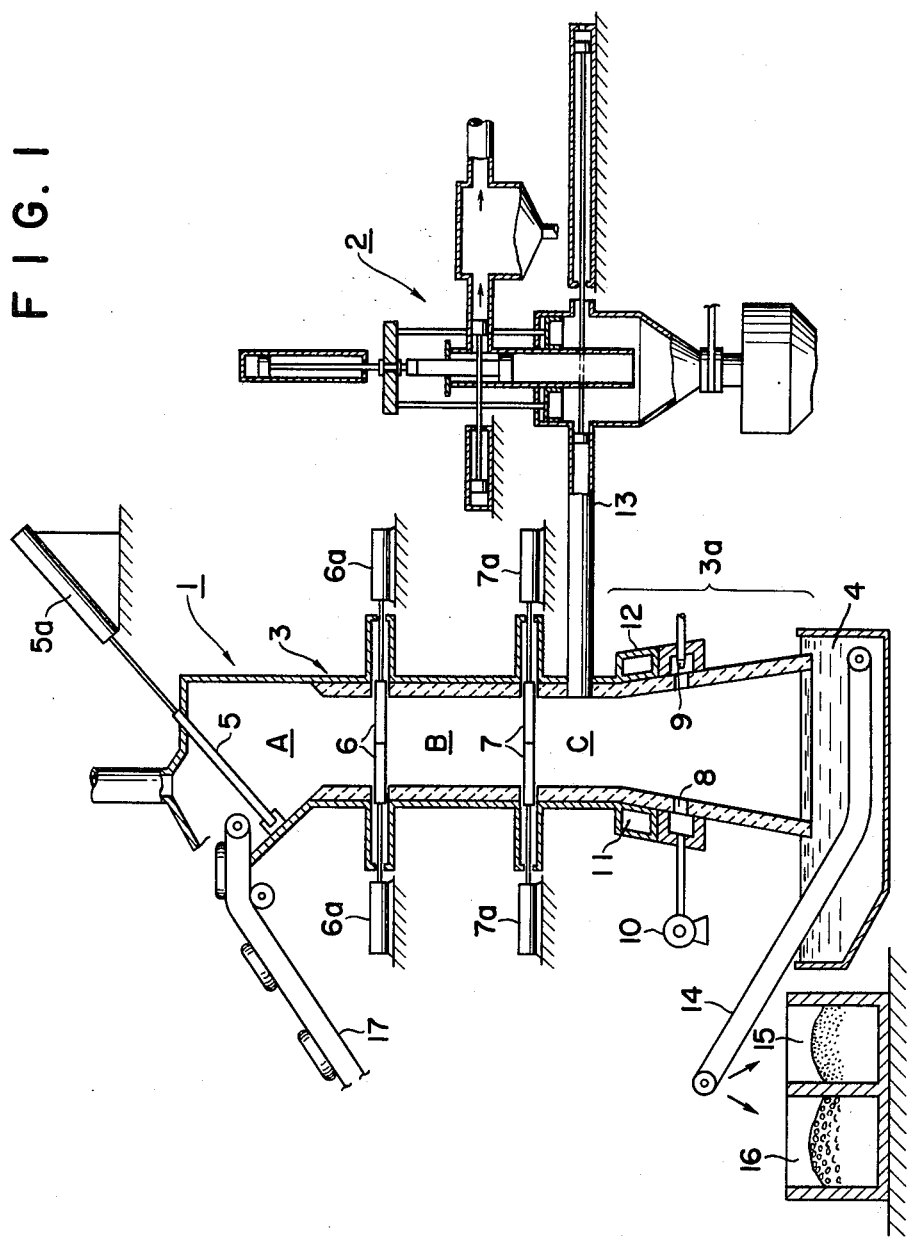
FIG. 1 is an elevational view, with parts shown in vertical section, showing the essential parts and structural organization of one example of an apparatus according to this invention by which the process of the invention can be practiced.

The process of dry distilling tires according to this invention can be practiced by means of the apparatus of the invention, one example of which is shown in FIG. 1. Broadly considered, this apparatus comprises a dry distillation furnace 1 and a separator 2.

The dry distillation furnace 1 has a vertical furnace structure 3 in the form of a hollow tower with a cross-sectional shape such as a circle, a square, an oblong rectangle, a polygon, or an ellipse. This furnace structure 3, the inner wall surface of which is lined with refractory material, has a constant cross-section shape and size over a greater part thereof, only its upper and lower end parts being of different shape. The lower end part 3a of this furnace structure 3 is outwardly flared and is immersed in water in a water-sealing device 4 comprising a tank holding the water. The top part of the furnace structure 3 is suitably formed to receive tires as described hereinafter and is provided with a leakage-sealing damper 5 for sealingly closing the top of the structure 3 to prevent escape of gases to the outside. The damper 5 is operated by a driving device 5a.

At an intermediate level in the upper part of the structure 3, a first pair of horizontal gate dampers 6,6, is provided to operate cooperatively across the entire cross section of the structure at that level. A second pair of horizontal gate dampers 7,7 similar to the first pair 6,6 is provided at a lower level of the structure 3. These gate dampers 6,6 and 7,7, as well as the above mentioned leakage-sealing damper 5 can be driven in their respective opening and shutting action either manually or by suitable powered driving devices 6a and 7a, respectively. The interior of the furnace structure 3 can thereby be divided into an upper chamber A between the damper 5 and the dampers 6,6, an intermediate chamber B between the dampers 6,6 and the dampers 7,7, and a lower reaction chamber C when these dampers are in closed state.

The furnace structure 3 is provided around its part enclosing the reaction chamber C with an annular tuyere 8 supplied with air for combustion from an air source 10, a group of burners 9 supplied with fuel from a fuel source for initiating combustion of tires and disposed in a horizontal circle in the furnace wall at substantially the same level as the tuyere 8, and an annular cooling jacket 12 in which coolant such as water flows. It has been found that the cooling jacket 12 serves to prevent the molten tire material from sticking to the furnace inner wall because the molten tire material is cooled by the wall and tends to solidify. A gas discharge outlet pipe 13 is provided through the furnace wall at the upper part of the combustion chamber C and is connected at its downstream end to the separator 2 described hereinafter.

A conveyor 14 is disposed at its upstream end in the aforementioned water-sealing device 4 at a position below the lower end of the furnace structure 3. The downstream part of this conveyor 14 extends obliquely upward and out of the water-sealing device 4 to a position above a solid residue collector 15 and a scrap wire collector 16.

As mentioned hereinbefore, an important feature of the dry distillation furnace in the apparatus of this invention is that the cross-sectional area of the interior of the furnace is constant or, as in the instant example thereof, expands progressively downward in the part 3a thereof below the level where dry distillation is carried out or, preferably, the level where oxidation combustion takes place. Moreover, there is no grate-like solid object for supporting the tires whatsoever within the furnace at its bottom part.

While there is no particular specification for the degree of expansion or flaring of the cross section of the furnace interior at its lower end part 3a, it should be designed in accordance with factors such as the sizes and kinds of the tires or cut-up tires to be processed. For example, in the case where a large quantity of tires having a high steel wire content are to be distilled, the furnace lower end part 3a should be widely flared. We have found, in general, that a flared lower end part 3a is desirable although in some cases a lower end part without any flare is suitable.

In general, this outward flare should be such that the angle between the inner wall surface of the lower end part 3a, as viewed in vertical section, and the vertical plumb direction is 0 to 10 degrees. By thus providing a lower end part 3a of this shape: (1) taking out of the solid residue and scrap wire is facilitated; (2) adhering of foreign matter to the inner wall surface of the furnace is prevented; and (3) "bridging" or log-jamming of solid matter across the furnace is prevented. A flare angle exceeding 10 degrees is disadvantageous because it will necessitate an increase in the sizes of the water sealing device 4 and the conveyor 14, and because it will cause excessive residue to drop onto the conveyor 14, which will make residue removal difficult.

The vertical position at which the furnace structure 3 starts to flare outward is determined in accordance with various conditions and factors. In the illustrated example, this vertical position is shown to be at the level of the cooling jacket 12. This is most desirable. However, the flared end part 3a may start at any level between a position immediately below the gates 7 and a position below the tuyere 8 and the burners 9.

The flared lower end part 3a of the furnace 3 may assume various shapes as viewed in elevation as indicated by some examples illustrated in FIGS. 4a through 4f and assume various shapes at different height levels as viewed in cross section as indicated in FIGS. 5a through 5d.

The above mentioned separator 2 connected to the downstream end of the gas discharge pipe 13 comprises, essentially, a separating device 21, which in the instant example is a cyclone separator, to whose inlet the pipe 13 is connected, a hopper 22 connected to the bottom of the cyclone 21 for extracting carbon particles, and a heat exchanger 24, to which the upper part of the central outlet tube 33 of the cyclone is connected by way of a gas discharge passage 23. The heat exchanger 24 has an outlet 24a and operates to cool and separate oils from the gases from which carbon particles have been separated in the separating device 21.

The separator is further provided with a carbon remover 26 disposed within the gas discharge pipe 13 and actuated by the actuating rod 25a of an actuating cylinder 25, an annular carbon remover 29 disposed within the cyclone 21, a carbon remover 28 disposed within the outlet tube 33, the carbon removers 28 and 29 being actuated by the actuating rods 27a, 27b and 27c of an actuating cylinder 27, and a carbon remover 32 disposed within the gas discharge passage 23 and actuated by the actuating rod 31a of an actuating cylinder 31. These carbon removers are actuated by their respective actuating cylinders to remove carbon adhering to the inner wall surfaces of their respective parts in which they are disposed.

The process of this invention is practiced by means of the above described apparatus in the following manner. Whole tires or cut-up tires are conveyed by means such as a conveyor 17 into the top part of the furnace 1. By opening the leakage-sealing damper 5, the tires thus conveyed are dropped at random onto the first pair of gate dampers 6,6.

The leakage-sealing damper 5 is provided to prevent leakage of a portion of the gases generated in the furnace which would otherwise rise, entering the chamber A as the first dampers 6,6 are opened and closed, and cause an explosion depending on the gas-air ratio. Furthermore, a tire supplying means which is relatively easy to seal from the outside air, such as a conveyor 17, is preferable. In addition, the second pair of dampers 7,7 are provided to prevent direct communication between the furnace interior and the outside air.

When a specific quantity of the tires has been supplied onto the first dampers 6,6, the operation of the conveyor 17 is automatically stopped by control means (not shown), and the leakage-sealing damper 5 is shut. Thereafter, the first dampers 6, 6 are opened, and all of the charged tires in the upper chamber A are dropped into the intermediate chamber B to rest on the second dampers 7, 7. The first dampers 6, 6 are then closed. Then, as the dry distillation reaction of the tires previously charged into the reaction chamber C progresses, and the volume of the charged tires in the reaction chamber C decreases, the second dampers 7, 7 are opened, the entire quantity of tires in the intermediate chamber B is released for shifting into the reaction chamber C.

In this case, however, since the state of filling and loading of the charged tires in the reaction chamber C is varying from second to second as the reaction proceeds, the tires in the intermediate chamber B may not entirely fall into the reaction chamber C, and a portion may remain in the chamber B in some instances. In such an event, the second dampers 7, 7 will become clogged and will not fully close, and a dangerous situation will arise if the first dampers 6, 6 are opened with the second dampers still in this clogged state. Accordingly, a safety mechanism (not shown) is provided to cause the second dampers 7, 7 to undergo repeated opening and shutting action until they can be fully closed and to prevent the first dampers 6, 6 from opening if the second dampers 7, 7 are not fully closed.

The tires which have been dropped and charged in this manner are stacked in a totally random manner within the reaction chamber C and form a self-sustaining "grate" of very high effectiveness because of the intrinsic shape of the tires.

In the initial start-up of the process, the tires are thus stacked in random state in the reaction chamber C, and, as air is fed thereinto at a suitable rate through the annular tuyere 8, the burners 9 are ignited thereby to form a combustion zone in this region from which combustion gases are generated.

When the combustion of the tires starts in this combustion zone, the burners 9 are extinguished, and only air necessary for the combustion is supplied to continue self-sustained combustion. As the oxygen in the gases generated by this combustion is consumed by combustion, the oxygen content progressively decreases below the explosion limit. As these gases rise in the furnace, they heat the charged tires and form a dry distillation zone. In general, a tire is composed of approximately 50 percent of a combustible volatile component, approximately 40 percent of a solid component comprising carbon powder, zinc white, and other solids as additives, and the remainder principally of steel wire.

One of the objects of this invention is to utilize the heat of combustion of the non-volatile carbon as energy for recovering the above mentioned combustible volatile component. Accordingly, the reaction within the furnace is carried out in a mode for achievement of this object. More specifically, in the dry distillation zone, the volatile component is vaporized by the gases of combustion at a high temperature, and the tires successively migrate into the combustion zone by dropping naturally. The remaining carbon undergoes combustion in this combustion zone due to blown in air and is used as fuel for generating combustion gases. At the same time, combustible substances other than the volatile component are burned and generate energy necessary for dry distillation. As a net result, the reaction assumes a so-called self-energy-compensation form, which is another important feature of this invention. Thus, a combustion zone and a dry distillation zone coexist within the furnace and must be maintained under mutually set conditions.

More specifically, the air for combustion is supplied through the tuyere 8 at a rate such that oxygen is supplied at a rate sufficient for the combustion of the carbon in the charged tires but not sufficient to burn the volatile combustible substances. Accordingly, only this combustion zone assumes a high temperature, and therefore the provision of the cooling jacket 12 around the outer wall at this part is effective for protecting the furnace structure 3. Within the furnace, since the dry distillation zone is formed above the combustion zone, the charged tires are heated by the combustion gases rising from below, and the volatile combustible substances are vaporized and are conducted out of the furnace through the gas discharge outlet and pipe 13.

The gases thus conducted out may be used as they are as combustion gases in a separate furnace. In addition, there are various other modes of utilizing these gases. For example, these gases are once cooled to remove heavy fractions as tar, and then, at room temperature, the light fractions and water content are separated into gaseous and liquid components which are used respectively as fuels.

Furthermore, the combustion residue in the combustion zone comprises metal wire containing a small quantity of incombustible additives and is extracted as it is from the furnace bottom. An effective method of accomplishing this is, since a load due to the tire charged into the furnace is imparted to this residue, to discharge it through the furnace bottom, for example, and to forcibly remove this residue by means of the conveyor 14.

Since the purpose of the reaction in the furnace is to accomplish dry distillation with insufficient oxygen, any leakage of outside air into the furnace is dangerous as a cause of an explosion. This danger is eliminated by making the furnace structure 3 gas-tight, providing the water-sealing device 4, and causing the pressure within the furnace to be positive.

In order to obtain a normally and steadily progressing reaction in the furnace, to take the vaporizable combustible component in a vaporized state out of the furnace while preventing as much as possible its combustion within the furnace, and, at the same time, to cause the carbon component to undergo combustion within the furnace as much as possible, it is necessary to carry out in a smooth and steady manner the charging of the tires and the taking out of the residue remaining after the dry distillation and combustion. For this purpose, one method is to provide a control system which, for example, detects the temperature within the furnace and, in response to the detection signal, causes the discharging conveyor 14 and the charging conveyor 17 to respectively start and stop.

More specifically, if the air supply into the furnace is continued with the charged tires in a stagnant state without steady downward movement, the combustion zone will progressively expand upward, and even the component to be vaporized will undergo combustion. Accordingly, there is provided a control system which detects the temperature at the upper part of the combustion zone and operates in response to the detection signal to drive the discharge conveyor 14 to take out the combustion residue and thereafter to cause newly supplied tires to be charged into the furnace.

Thus, by the process of this invention as described above: tires are efficiently processed at a high rate; gaseous and liquid fuels are continuously produced; and, moreover, and steel wire in the tires are recovered as steel scrap.

In order to indicate more fully the nature and utility of this invention, the following specific examples of practice are set forth, it being understood that these examples are presented as illustrative only and that they are not intended to limit the scope of the invention.

EXAMPLE 1

A vertical furnace having a cylindrical furnace structure (3) of a total height of 10 meters (m), a diameter at the upper end of 1.3 m, and a diameter at the lower end of 1.8 m was used. This furnace structure had first dampers (6,6) at a position 2.5 m below the top, second dampers (7,7) 1.5 m below the first dampers, a tuyere (8) for blowing in air and ignition burners (9) 1.3 m above the furnace bottom end, and a gas discharge outlet (13) 1 m below the second dampers.

The lower 0.3 m of this furnace structure was immersed in water (4) in a water tank provided at its bottom with a discharge conveyor (14) for carrying out residue. A tire feeding conveyor (17) was provided at the upper part of the furnace.

First, tires and cut-up tires were fed by the feeding conveyor (17) into the upper part of the furnace. By opening and closing the first and second dampers (6,6) and (7,7), the tires were charged into the furnace in divided lots of approximately 10 tires. When the reaction chamber (C) below the second dampers was substantially full, the charging was stopped. Air was then fed through the tuyere (8) into the reaction chamber, and, at the same time, the burners (9) were operated thereby to form a combustion zone. When this combustion chamber had been heated to a specific temperature, the burners were extinguished, and the combustion was thereafter continued by feeding only air.

As the combustion gases thus generated flowed upward through the layers of randomly charged tires, dry distillation took place, and volatile combustible substances vaporized and, together with the combustion gases, were discharged out of the furnace through the outlet and pipe (13) and into a cyclone separator (21) of the separator (2).

In the operation of feeding and charging the tires, the discharge conveyor 14 was operated intermittently every 90 seconds, and the residue was thus removed in accordance with the quantity of tires charged into the intermediate chamber (B) between the first and second dampers. Accordingly, when a space was formed at the upper part of the reaction chamber (C), the second dampers were opened to cause the tires in the intermediate chamber (B) to drop and thereby to fill the reaction chamber. Then the second dampers were closed, and the leakage-sealing damper (5) was thereafter opened to cause the tires, in a quantity corresponding to the residue removed, to drop into the upper chamber (A). The leakage-sealing damper was then closed. Thereafter, the first dampers were opened to cause the tires in the upper chamber to drop into the intermediate chamber (B), and then the first damper is closed.

The apparatus of this invention was operated continuously for 250 hours, whereupon it was found that, in terms of percent by weight of the charged tires, the quantity of the vaporized and recovered fuel was approximately 40 percent, that of the collected free solid matter was approximately 40 percent, and that of the combustion residue such as wire was approximately 10 percent. Furthermore, the unburned matter at the furnace bottom at the time of start of the operation was again charged into the top of the furnace and therefore did not require any special processing.

EXAMPLE 2

Figure 2:
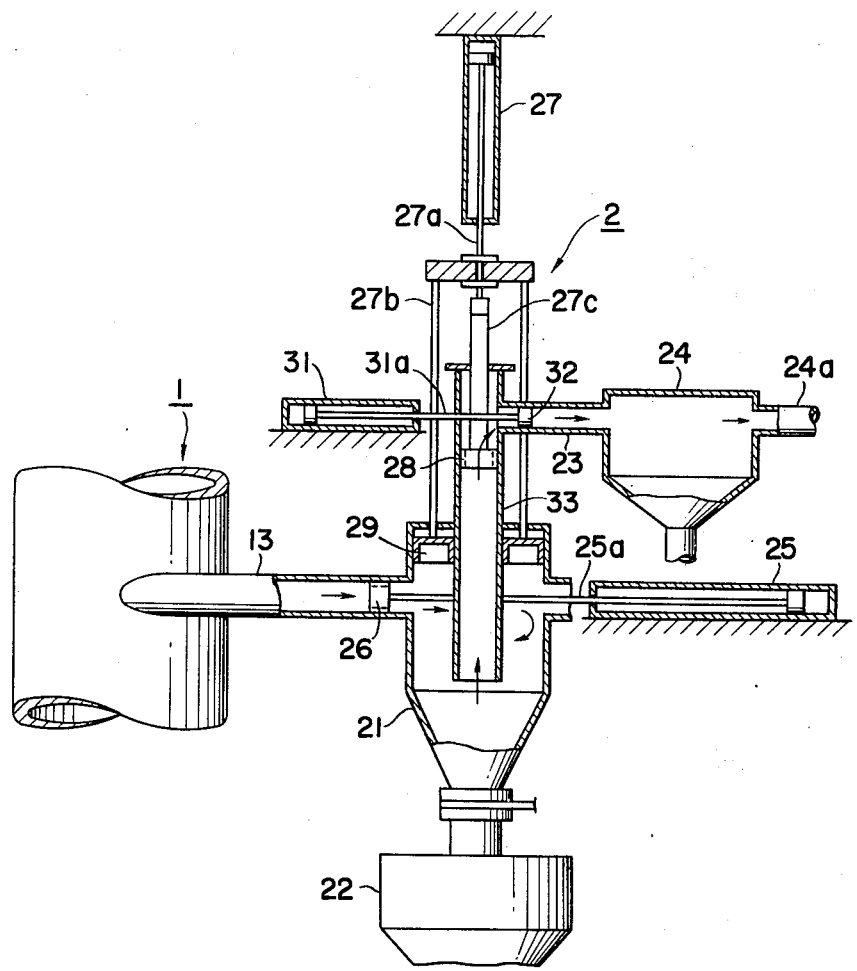
FIG. 2 is an elevational view, with parts shown in vertical section, showing a separator for separating and removing carbon particles and oils from gases obtained by dry distillation according to the invention.

As described above, the vaporized volatile combustible substances produced by the dry distillation in the distillation furnace (1), together with the combustion gases, were discharged out of the furnace through the outlet and pipe (13) and supplied into the cyclone separator (21) of the separator (2), which had a construction substantially the same as that of the separator illustrated in FIGS. 1, 2, and 3.

In this separator, the cyclone separator operated to separate carbon particles from the gases thus supplied, and the gases thus separated and free of carbon particles were passed through the heat exchanger (24), where oils were separated from the gases.

During these separation operations in the separator, the gas discharge pipe (13) for supplying gases into the separator, the interior parts of the cyclone separator, and the gas discharge passage (23) for supplying gases into the heat exchanger were cleansed of carbon particles adhering to their respective inner wall surfaces by the carbon removers (26), (28), (29), and (32), respectively. The actuating cylinders (25), (27), and (31) for actuating these carbon removers were operated intermittently, that is, at intervals of 5 minutes, by respective timers.

It was found that even after 600 hours of continuous operation, there were no indications of malfunctioning or defects in either the dry distillation furnace or the separator, and it was obvious that the operation could have been continued much longer. This performance, which is due in part to the efficient removal of carbon by the separator, far exceeds that obtainable heretofore in the prior art, in which the limit of continuous operation has ordinarily been of the order of 72 hours.

An indirect benefit of this invention is that it affords saving of energy and does not polute the environment. That is, as mentioned hereinbefore, tires have a calorific value of 8,000 Kcal/kg, which has heretofore not been utilized in a continuous manner on a quantity-production scale. This invention affords utilization of this energy latent in discarded tires by a continuous process on a large-quantity scale.

What we claim is:

1. A process for the dry distillation of discarded tires with metal wire embedded therein, comprising the steps of:
    charging the tires in a randomly stacked state into the upper part of a vertical furnace whose horizontal cross-sectional area of its interior at its lower part is equal to, or greater than the cross-sectional areas at higher parts of the furnace;
    causing the thus-stacked tires to descend progressively into a reaction chamber provided in the lower part of the furnace and having an open bottom sealed by a pool of liquid;
    isolating the reaction chamber from the upper interior of the furnace after the tires have been charged thereinto in a randomly stacked state;
    causing the lower tires within the reaction chamber to undergo oxidation combustion while dry distilling the upper tires within the reaction chamber with the resulting combustion bases by introducing oxygen into the lowest portion of the furnace in amounts sufficient to substantially combust the carbon in the tires, but insufficient to burn the volatile combustible substances produced from the dry distillation of the tires at the upper portion of the furnace, said oxidation combustion and said dry distillation of the tires producing a tire residue comprising the metal wire in the bottom part of the reaction chamber;
    braking the descent of the tires, which are being subjected to the oxidation combustion and dry distillation, by a temporarily self-formed and self-sustained grate effect of the solid residue composed predominantly of metal wire sticking to the inner wall of the reaction chamber;
    removing the metal wire which descends to the bottom of the reaction chamber as the tires move downward making use of the cross-sectional area of the lower part of the furnace, which is as large or larger than the upper portion of the furnace, while leaving the upper part of the wire containing residue working as a grate as it is periodically formed on the inner wall of the furnace;
    collecting distilled gaseous fuel and/or liquid fuel from within the reaction chamber while the distillation is carried out; and
    separating carbon particles from the collected fuel by means of a device for separating said carbon particles.

2. A process as claimed in claim 1 in which the tires are caused to descend through the furnace whose interior at its lower part is flared outward to increase in horizontal cross-sectional area in the downward direction so as to facilitate the movement of the tires to the bottom of the furnace.

3. A process as claimed in claim 1, further comprising the step of removing the separated carbon particles from the inner walls of said device for separating carbon particles.

* * * * *